United States Patent
Rack et al.

(10) Patent No.: US 11,420,719 B2
(45) Date of Patent: Aug. 23, 2022

(54) SHEAR CONNECTION FOR CONNECTING AIRFRAME PARTS IN AN AIRCRAFT

(71) Applicant: AIRBUS HELICOPTERS DEUTSCHLAND GMBH, Donauworth (DE)

(72) Inventors: Andreas Rack, Burghausen (DE); Thomas Joachim, Augsburg (DE); Rupert Pfaller, Riemerling (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 730 days.

(21) Appl. No.: 16/263,877

(22) Filed: Jan. 31, 2019

(65) Prior Publication Data

US 2019/0241245 A1 Aug. 8, 2019

(30) Foreign Application Priority Data

Feb. 2, 2018 (EP) .................................. 18400004

(51) Int. Cl.
*B64C 1/06* (2006.01)
*B64C 1/12* (2006.01)
(Continued)

(52) U.S. Cl.
CPC ................ *B64C 1/069* (2013.01); *B32B 3/06* (2013.01); *B64C 1/061* (2013.01); *B64C 1/12* (2013.01);
(Continued)

(58) Field of Classification Search
CPC .. B64C 1/069; B64C 1/12; B64C 1/26; B64C 27/82; B64C 3/26; B64C 1/061;
(Continued)

(56) References Cited

U.S. PATENT DOCUMENTS 3,295,876 A * 1/1967 Molin ....................... B64C 1/14
52/584.1
7,875,333 B2 1/2011 Stephan
(Continued)

FOREIGN PATENT DOCUMENTS

| DE | 102007063608 A1 | 11/2008 |
|---|---|---|
| DE | 102014102117 A1 | 8/2015 |
| WO | 2010089578 A1 | 8/2010 |

OTHER PUBLICATIONS

European Search Report for Application No. 18400004, Completed by the European Patent Office, dated Aug. 1, 2018, 9 pages.

*Primary Examiner* — Assres H Woldemaryam
(74) *Attorney, Agent, or Firm* — Brooks Kushman P.C.

(57) ABSTRACT

A shear connection for interchangeably connecting two airframe parts of an aircraft. The shear connection may include first and second interface parts. The second interface part may overlap in the longitudinal direction at an overlap section with at least one of the first interface part and the first airframe part. The shear connection may further comprise means that rigidly and non-interchangeably attach the first interface part to the first airframe part and the second interface part to the second airframe part and a shear bolt that rigidly and interchangeably connects the second interface part with the at least one of the first interface part and the first airframe part at the overlap section, thereby interchangeably connecting the first and second airframe parts.

20 Claims, 10 Drawing Sheets

(51) Int. Cl.
*B64C 1/26* (2006.01)
*B64C 27/82* (2006.01)
*F16B 5/00* (2006.01)
*B64C 3/26* (2006.01)
*B32B 3/06* (2006.01)
*F16B 11/00* (2006.01)
*F16B 7/18* (2006.01)

(52) U.S. Cl.
CPC ................ *B64C 1/26* (2013.01); *B64C 3/26* (2013.01); *B64C 27/82* (2013.01); *F16B 5/0088* (2013.01); *F16B 7/182* (2013.01); *F16B 11/006* (2013.01)

(58) Field of Classification Search
CPC ...... F16B 5/0088; F16B 11/006; F16B 7/182; B32B 3/06
See application file for complete search history.

(56) References Cited

U.S. PATENT DOCUMENTS

| | | | | |
|---|---|---|---|---|
| 8,555,481 | B2* | 10/2013 | Porter | B64C 1/06 |
| | | | | 29/525.02 |
| 8,573,539 | B2* | 11/2013 | Honorato | B64C 1/26 |
| | | | | 244/123.1 |
| 8,985,512 | B1* | 3/2015 | Chan | B64C 1/1484 |
| | | | | 244/120 |
| 9,096,324 | B2* | 8/2015 | Erickson | B64D 37/005 |
| 9,314,875 | B2* | 4/2016 | Stephan | B23K 26/24 |
| 2007/0051851 | A1* | 3/2007 | Ruffin | F16B 5/0275 |
| | | | | 244/131 |
| 2010/0077690 | A1 | 4/2010 | Durand | |
| 2011/0056066 | A1* | 3/2011 | Alvez | B64F 5/10 |
| | | | | 29/525.06 |
| 2016/0244143 | A1 | 8/2016 | Foster et al. | |
| 2016/0288899 | A1* | 10/2016 | Dobberfuhl | B64C 3/26 |
| 2017/0327200 | A1* | 11/2017 | Probst | B64C 1/26 |

* cited by examiner

SHEAR CONNECTION FOR CONNECTING AIRFRAME PARTS IN AN AIRCRAFT

CROSS-REFERENCE TO RELATED APPLICATIONS

This application claims priority to European patent application No. EP 18400004.0 filed on Feb. 2, 2018, the disclosure of which is incorporated in its entirety by reference herein.

BACKGROUND OF THE INVENTION

(1) Field of the Invention

The invention is related to shear connections in an assembled aircraft, and, more particularly, to shear connections that rigidly and interchangeably connect two airframe parts of an aircraft.

2) Description of Related Art

Different airframe parts of an aircraft are subject to different stresses including torsion, shear, compression, tension, and bending that these airframe parts need to transfer. Special care needs to be taken at the interface plane of a connection interface where two airframe parts are connected with each other to form a shear connection, for example.

Generally, it is advantageous to interchangeably connect two parts of an aircraft (e.g., the tail boom of a helicopter to the fuselage or the wings of an airplane to the fuselage), thereby enabling a relatively easy exchange of one of the airframe parts (e.g., the tail boom of the helicopter or the wings of the airplane). Furthermore, it is desirable that the exchange operation can be performed during the maintenance of the aircraft and does not require the return of the aircraft to the manufacturer. Therefore, extensive shimming, milling, or sanding operations should not be required as part of the exchange operation.

Current solutions for interchangeably connecting a rear fuselage and a tail boom are often based on a double flange connection. The double flange connection transfers the load between the tail boom and the fuselage via the bending of a flange. Thus, an initially pure normal force causes a bending moment at the flanges at both sides of the interface connection. The transfer of such a bending moment requires a higher wall thicknesses and thus an increased weight. Moreover, such a force is not appropriate for composite designs. Due to the 90° kink in the load flow, high inter laminar stresses occur that require local reinforcements with additional brackets. Therefore, metals that are more appropriate for such a load transfer are often used for such a connection interface. The drawbacks of using metals are related to corrosion issues when, for example, aluminum is used. To circumvent the corrosion issue, some solutions use the more expensive and heavier titanium. Fretting corrosion can also occur in some solutions, leading to a reduction of the fatigue strength. Furthermore, sufficient long bolts (incl. bushings) are often required to guarantee pretension of the bolt joint.

An alternative solution that avoids some of the above-mentioned disadvantages is based on bushings that are placed in oversize holes with liquid shim and the help of a jig. However, this solution usually leads to higher manufacturing costs due to the placement of the bushings with shim in oversized holes. Strength investigations show that this seems to be a viable solution. However, some problems remain. For example, the bushings of the part that is not exchanged can fall out. In this case, precision of the fixation at the interface part is not guaranteed.

The document DE 10 2014 102 117 A1 describes a flow body component with an outer flow surface that is connected, by means of a rivet, with a profile element that forms a structural joint for connecting other flow body components. However, the structural joint, as described, lacks an interchanging element.

The documents US 2010/0077690 A1 and US 2016/0244143 A1 describe a liaison element to which two panels of an aircraft wing are connected in order to make the joint between the two panels removable. Only one of the two panels is connected to the liaison element with a removable screw to provide access to the internal space of the wing created by the two panels and a smooth and aerodynamically efficient surface in the connection area. The connection is not designed to be exchangeable respectively interchangeable for other parts or panels. Just the same panel can be removed for maintenance work inside the wing, if desired. Realizing interchangeability by using this concept would lead to machining on either of the two airframe parts, which is not desirable.

BRIEF SUMMARY OF THE INVENTION

It is, therefore, an objective of the present invention to provide an interchangeable connection for airframe parts in which all loads are transferred via shear. Such an interchangeable connection in which all loads are transferred via shear is sometimes also referred to as a shear connection. As a further objective, the shear connection should enable the relatively easy exchange of the airframe parts. Furthermore, it is desirable that the exchange operation can be performed during the maintenance of the aircraft by the owner and does not require the return of the aircraft to the manufacturer. Moreover, the shear connection should be lightweight, reliable, robust, and easily manufacturable at a comparatively low cost.

These objectives are solved by a shear connection that comprises the features of claim 1.

More specifically, according to the present invention a shear connection in an aircraft for connecting a first airframe part having a longitudinal direction with a second airframe part, may be characterized by comprising a first interface part, a second interface part that overlaps in the longitudinal direction at an overlap section with at least one of the first interface part and the first airframe part, means that rigidly and non-interchangeably attach the first interface part to the first airframe part and the second interface part to the second airframe part, and a shear bolt that rigidly and interchangeably connects the second interface part with the at least one of the first interface part and the first airframe part at the overlap section, thereby interchangeably connecting the first and second airframe parts.

According to one aspect, the means that rigidly and non-interchangeably attach the first interface part to the first airframe part and the second interface part to the second airframe part comprise at least one of a bonding material, a welding material, a rivet, or a screw.

According to one aspect, the first and second airframe parts are non-overlapping with the overlap section.

According to one aspect, the second airframe part has an inside and an outside surface, wherein the second interface part is attached to the outside surface of the second airframe part.

According to one aspect, the second airframe part has an inside and an outside surface, wherein the second interface part is attached to the inside surface of the second airframe part.

According to one aspect, the first airframe part at least partially overlaps the second interface part at the overlap section.

Advantageously, the second airframe part at least partially overlaps the first airframe part at the overlap section.

According to some embodiments, the shear bolt rigidly and interchangeably connects the second interface part with the first and second airframe parts.

Advantageously, the shear bolt rigidly and interchangeably connects the first and second interface parts with the first airframe part.

According to one aspect, each of the first and second interface parts comprises a shear joint.

According to one aspect, the shear connection may further comprise a web integrated into at least one of the first and second interface parts.

According to one aspect, the web is perpendicular to the longitudinal direction.

According to one aspect, the first airframe part is slotted and overlaps the second interface part in the longitudinal direction at the overlap section on both sides.

According to one aspect, the second airframe part is slotted and overlaps the second interface part in the longitudinal direction.

According to one aspect, the shear connection may further comprise a plurality of pilot holes for the means that rigidly and non-interchangeably attach the first interface part to the first airframe part and the second interface part to the second airframe part in the first and second airframe parts to secure a precise fit at the shear connection.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
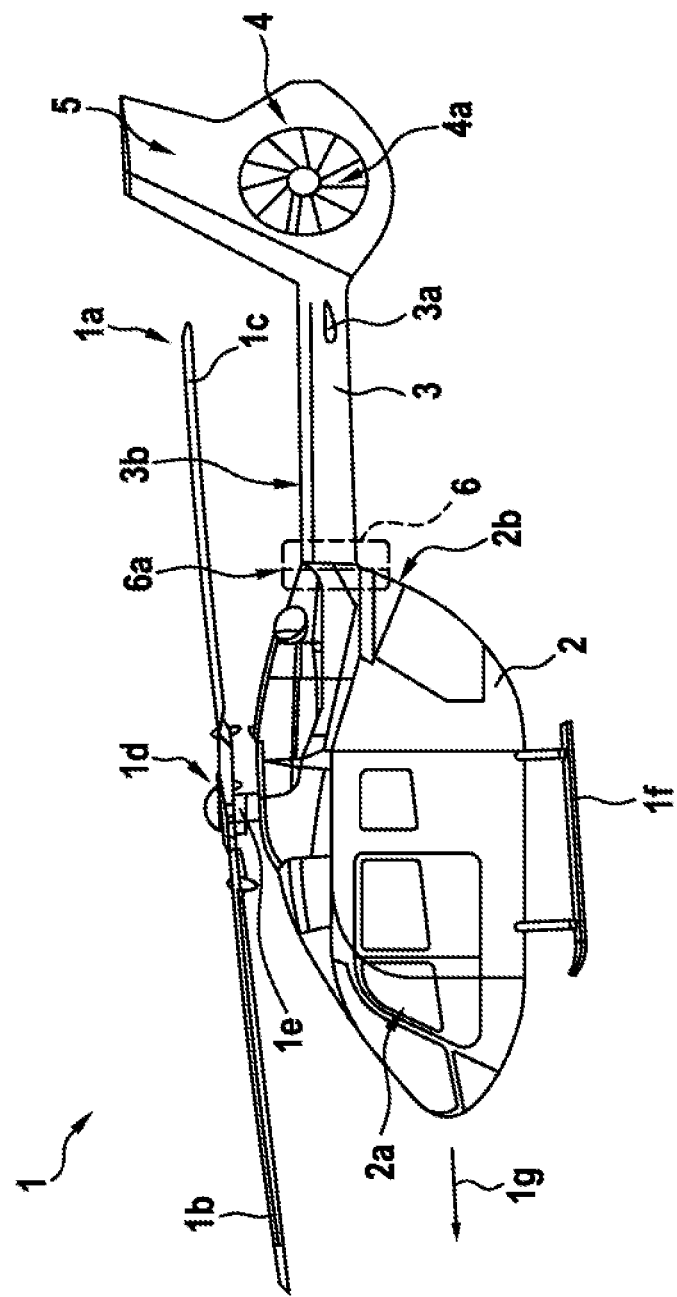
FIG. 1 is a diagram of an illustrative rotary-wing aircraft in accordance with some embodiments.

FIG. 1 shows an aircraft 1 that is exemplarily illustrated as a rotary-wing aircraft and, more particularly, as a helicopter. Thus, for purposes of simplicity and clarity, the aircraft 1 is hereinafter referred to as "helicopter" 1.

Illustratively, helicopter 1 comprises a fuselage 2 that is connected to a landing gear 1f and defines a cabin 2a and a rear fuselage 2b. The rear fuselage 2b is connected to a tail boom 3 having a longitudinal extension direction 1g.

Helicopter 1 further comprises at least one multi-blade main rotor 1a for providing lift and forward or backward thrust during operation. The at least one multi-blade main rotor 1a comprises a plurality of rotor blades 1b, 1c that are mounted at an associated rotor head 1d to a rotor shaft 1e, which rotates in operation of the helicopter 1 around an associated rotor axis.

By way of example, helicopter 1 further comprises at least one preferentially shrouded counter-torque device 4 configured to provide counter-torque during operation, i. e. to counter the torque created by rotation of the at least one multi-blade main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5. Illustratively, the tail boom 3 is also provided with a suitable horizontal stabilizer 3a.

If desired, the tail boom 3 may be a (sandwich) composite tail boom, i. e. a tail boom that comprises composite material and that is at least partially manufactured from composite material. Such composite tail booms are well-known to the person skilled in the art and, therefore, not described in further detail for brevity and conciseness.

Illustratively, the composite tail boom 3 may be implemented as a slim beam element essentially oriented in its longitudinal extension direction 1g, i. e. at least essentially in parallel to an underlying longitudinal axis of the helicopter 1, and comprises at least a tubular tail boom cone 3b that is connected to the fuselage 2 and, more specifically, the rear fuselage 2b, at an associated connection interface 6. This connection interface 6 may have an associated interface plane 6a that constitutes a shear connection.

Thus, as an example and without loss of generality, tail boom cone 3b and rear fuselage 2b may be considered to represent two airframe parts that are connected with each other at a shear connection. Note that there are many other airframe parts that are connected with each other at a shear connection. Other examples of two airframe parts that are connected with each other at a shear connection include a wing and a fuselage, a landing gear and a fuselage, a horizontal stabilizer and a fuselage, a fin and a fuselage, a first part of a fuselage/wing/tail boom/landing gear and a second part of the fuselage/wing/tail boom/landing gear, just to name a few.

If desired, the two airframe parts that are connected with each other at a shear connection may each have a shear joint. The shear joint of each of the two airframe parts may be manufactured with high precision to provide for an easy fitting procedure when connecting the two airframe parts with each other. For example, the manufacturing may include milling operations after a curing process. Alternatively, the manufacturing may include an exact curing process using special tooling that does not require an additional milling operation.

Each of the two airframe parts may have interface parts that are rigidly and non-interchangeably attached to the respective airframe part by bonding, film diffusion, welding, riveting, screwing or a combination of these manufacturing processes. Exchanging one of the two airframe parts may involve using a precision jig in which both sides of the interface are drilled. If one or both of the interface parts of the two airframe parts are not stiff enough, the jig may maintain the precise connection interface contact until it is connected to and stiffened with the other airframe part. If desired, an integrated web or flange may provide increased stiffness of at least one of the interface parts.

In some embodiments, pilot holes may hold at least one of the two airframe parts in place to secure a correct positioning at the connection interface and to ensure a precise fit of the airframe parts until all of the holes of the shear connection are aligned. If desired, a shear pin may allow for easier positioning of one of the two airframe parts.

Figure 2A:
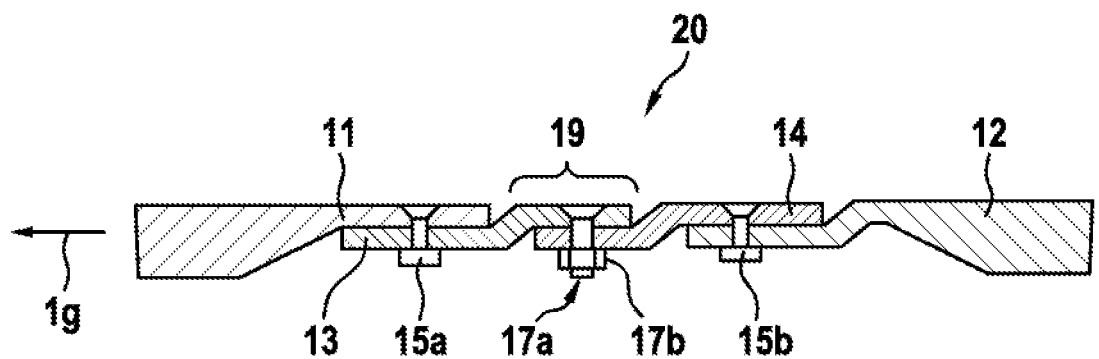
FIG. 2A is a diagram showing a cross-section of an illustrative shear connection with two s-shaped interface parts that are rigidly and interchangeably connected to each other in an overlap section in accordance with some embodiments.

A diagram showing a cross-section of an illustrative shear connection in accordance with some embodiments is shown in FIG. 2A. As shown in FIG. 2A, shear connection 20 may include airframe parts 11 and 12, interface parts 13 and 14, rivets or screws 15a and 15b, and a shear bolt including bolt 17a and nut 17b.

Rivets or screws 15a and 15b may rigidly and non-interchangeably attach interface parts 13 and 14 to airframe parts 11 and 12, respectively. If desired, bonding or welding materials or a combination of rivets or screws and bonding or welding materials may be used to rigidly and non-interchangeably attach interface parts 13 and 14 to airframe parts 11 and 12, respectively. As shown in FIG. 2A, airframe parts 11 and 12 may only overlap with interface parts 13 and 14, respectively and be non-overlapping with each other and with overlap section 19.

Interface parts 13 and 14 may overlap each other in a longitudinal direction 1g at an overlap section 19. A shear bolt including bolt 17a and nut 17b may rigidly and interchangeably connect the interface parts 13 and 14 at the overlap section, thereby interchangeably connecting airframe parts 11 and 12.

Figure 2B:
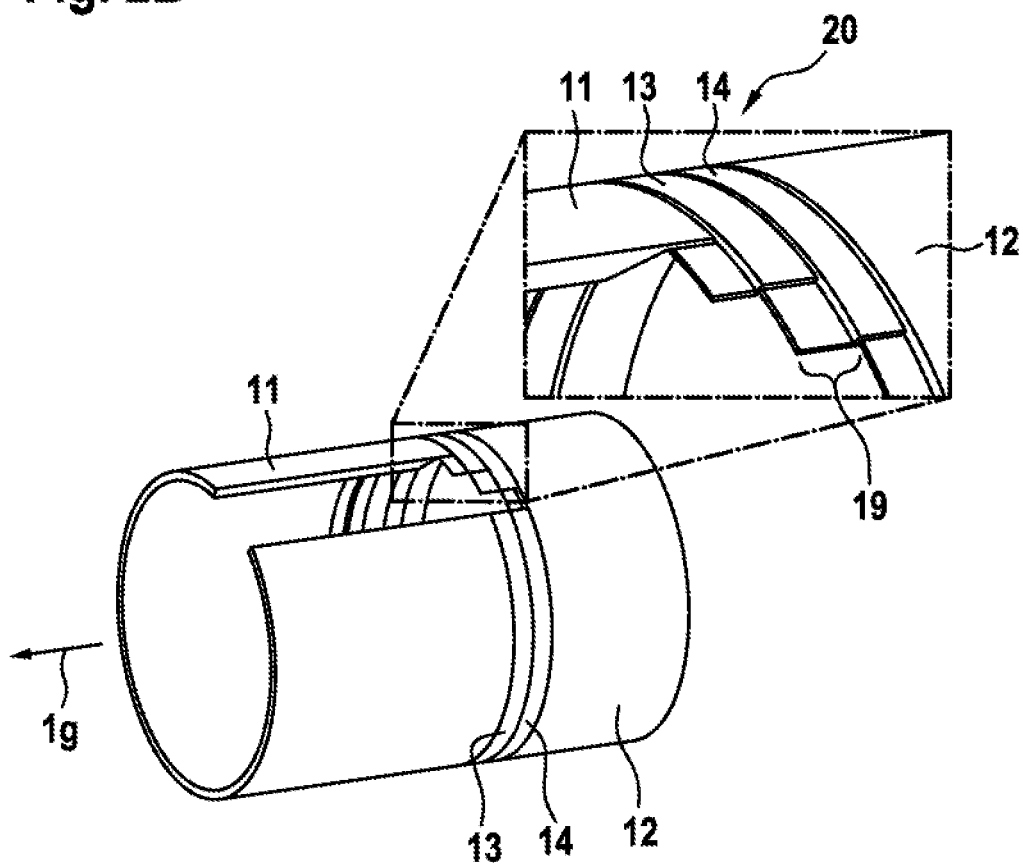
FIG. 2B is a diagram of a three-dimensional representation of the illustrative shear connection of FIG. 2A in accordance with some embodiments.

FIG. 2B is a diagram of a three-dimensional representation of the illustrative shear connection of FIG. 2A in accordance with some embodiments. As shown in FIG. 2B, airframe parts 11 and 12 may each have an inside surface and an outside surface. As an example, interface part 13 may be attached to the inside surface of airframe part 11, and interface part 14 may be attached to the outside surface of airframe part 12.

Figure 3A:
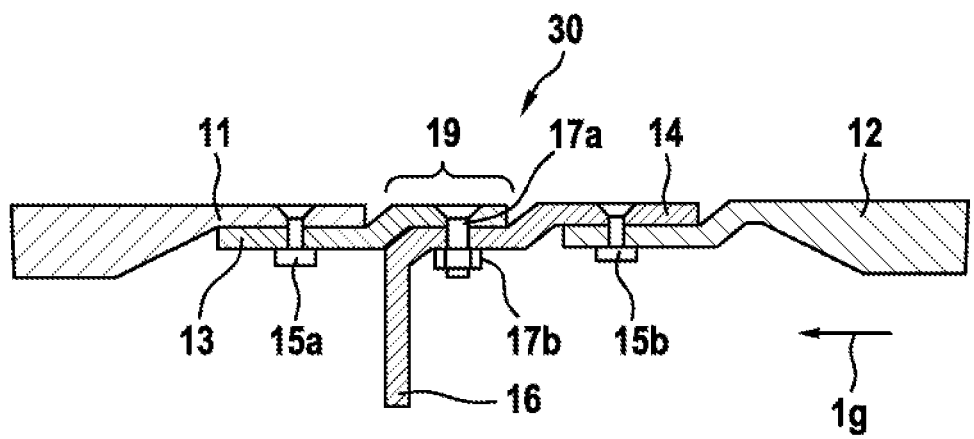
FIG. 3A is a diagram showing a cross-section of an illustrative shear connection with two s-shaped interface parts, one of which one has an integrated web, that are rigidly and interchangeably connected to each other in an overlap section in accordance with some embodiments.

In some embodiments, a web or flange may provide increased stiffness at the shear connection. FIG. 3A is a diagram showing a cross-section of an illustrative shear connection with two s-shaped interface parts of which one has an integrated web. As shown in FIG. 3A, shear connection 30 may include airframe parts 11 and 12, rivets or screws 15a and 15b, a shear bolt including bolt 17a and nut 17b, and interface parts 13 and 14. Interface part 14 may have integrated web 16. Integrated web 16 may be perpendicular to longitudinal direction 1g. If desired, shear connection 30 may be assembled in a same way as shear connection 20 of FIG. 2A.

Figure 3B:
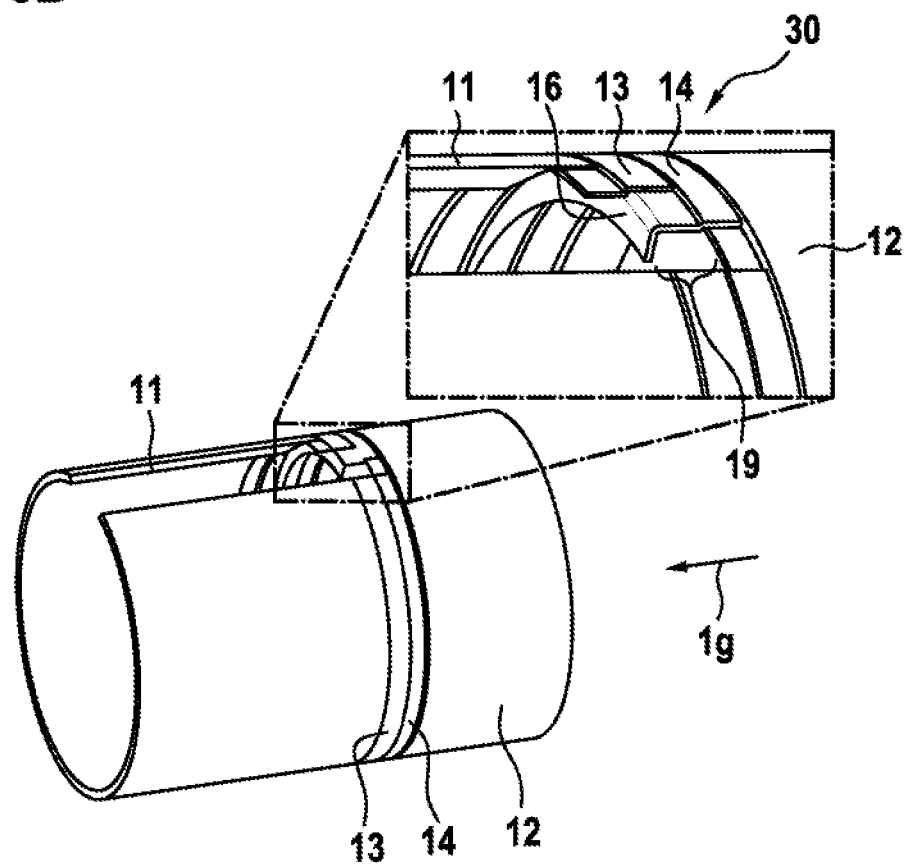
FIG. 3B is a diagram of a three-dimensional representation of the illustrative shear connection of FIG. 3A in accordance with some embodiments.

FIG. 3B is a diagram of a three-dimensional representation of the illustrative shear connection of FIG. 3A in accordance with some embodiments. As shown in FIG. 3B, airframe parts 11 and 12 may each have an inside surface and an outside surface. As an example, interface part 13 may be attached to the inside surface of airframe part 11, and interface part 14 may be attached to the outside surface of airframe part 12. As shown in FIG. 3B, web 16 may extend to the inside of shear connection 30.

Web 16 may have an arbitrary extension inside the structure formed by airframe part 12. In some embodiments, web 16 may have a relatively short extension. For example, web 16 may have a length that is comparable to the width of overlap area 19. In other embodiments, web 16 may have a relatively long extension. For example, web 16 may have a length such that it reaches across the structure formed by the inside surface of airframe part 12.

Figure 4A:
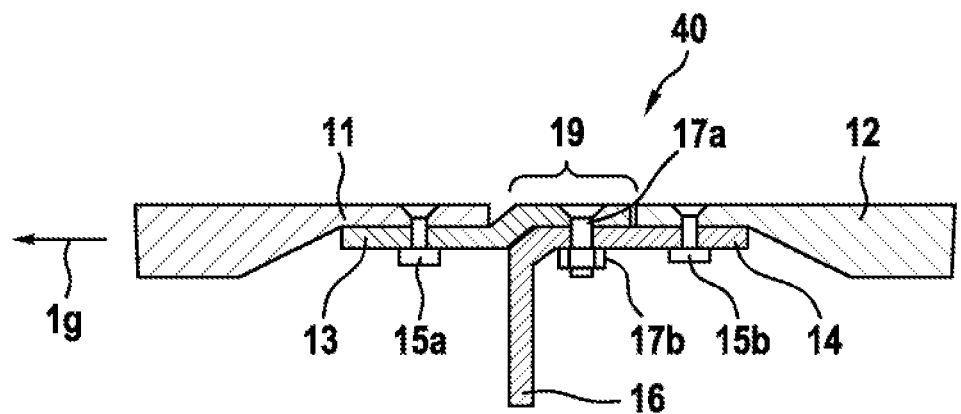
FIG. 4A is a diagram showing a cross-section of an illustrative shear connection with one s-shaped interface part and a straight interface part with an integrated web that are rigidly and interchangeably connected to each other in an overlap section in accordance with some embodiments.
Figure 4B:
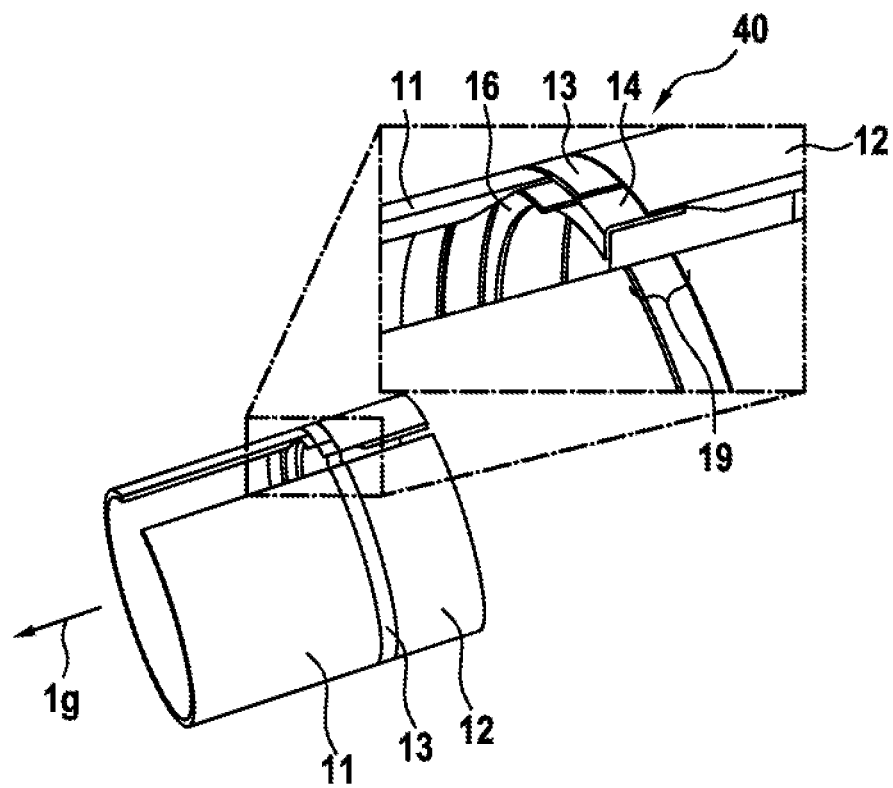
FIG. 4B is a diagram of a three-dimensional representation of the illustrative shear connection of FIG. 4A in accordance with some embodiments.
Figure 5:
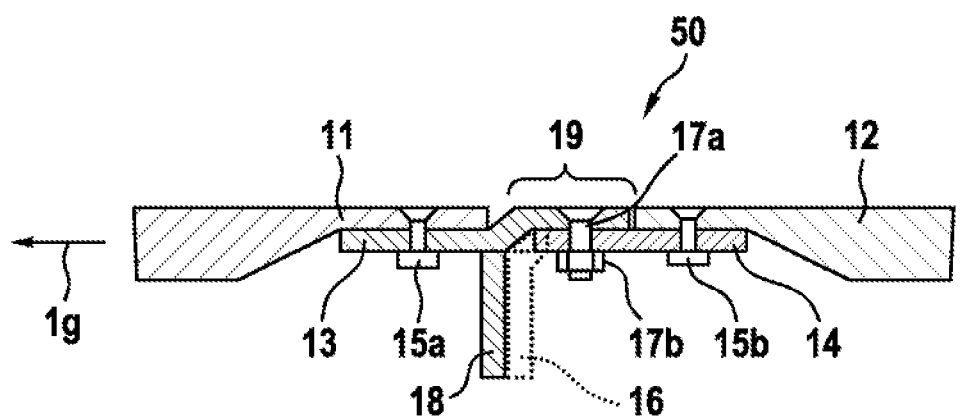
FIG. 5 is a diagram showing a cross-section of an illustrative shear connection with one s-shaped interface part with an integrated web and a straight interface part that are rigidly and interchangeably connected to each other in an overlap section in accordance with some embodiments.

In some embodiments, each shear joint may have the respective interface part attached to the inside surface of the respective airframe part. In these embodiments, at least one of the interface parts is a straight interface part. FIGS. 4A, 4B, and 5 show illustrative shear connections with one s-shaped interface part and one straight interface part.

As shown in FIG. 4A, shear connection 40 may include airframe parts 11 and 12, rivets or screws 15a and 15b, a shear bolt including bolt 17a and nut 17b, and interface parts 13 and 14. Interface part 14 may be a straight interface part in longitudinal direction 1g and have an integrated web 16. Integrated web 16 may be perpendicular to longitudinal direction 1g. If desired, shear connection 40 may be assembled in a similar way as shear connection 30 of FIG. 3A with the exception of the attachment of interface part 14. As shown, a screw or a rivet 15b and, if desired, welding or bonding material may attach interface part 14 at the inside surface of airframe part 12.

FIG. 4B is a diagram of a three-dimensional representation of the illustrative shear connection of FIG. 4A in accordance with some embodiments. As shown in FIG. 4B, airframe parts 11 and 12 may each have an inside surface and an outside surface. As an example, interface parts 13 and 14 may both be attached to the inside surface of airframe part 11 and 12, respectively.

Rivet or screw 15b may rigidly and non-interchangeably attach interface part 14 to airframe part 12 on the inside surface. If desired, bonding or welding materials or a combination of a rivet or a screw and bonding or welding materials may be used to rigidly and non-interchangeably attach interface part 14 to airframe part 12. As shown in FIG. 4B, web 16 may extend to the inside of shear connection 40.

FIG. 5 is a diagram showing a cross-section of another illustrative shear connection with an s-shaped interface part with an integrated web and a straight interface part with an optional integrated web. As shown in FIG. 5, shear connection 50 may include airframe parts 11 and 12, rivets or screws 15a and 15b, a shear bolt including bolt 17a and nut 17b, and interface parts 13 and 14. Interface part 13 may be an s-shaped interface part with an integrated web 18. Interface part 14 may be a straight interface part in longitudinal direction 1g and have an optional integrated web 16. Optional integrated web 16 and/or integrated web 18 may be perpendicular to longitudinal direction 1g. If desired, shear connection 50 may be assembled in a similar way as shear connection 40 of FIG. 4A.

In some embodiments, the airframe parts may form an adjacent edge to edge connection without any interface part in-between, for example to avoid a disruption of airflow at the shear connection. Examples for such embodiments are shown in FIGS. 6, 7, 8, 9A, and 9B.

Figure 6:
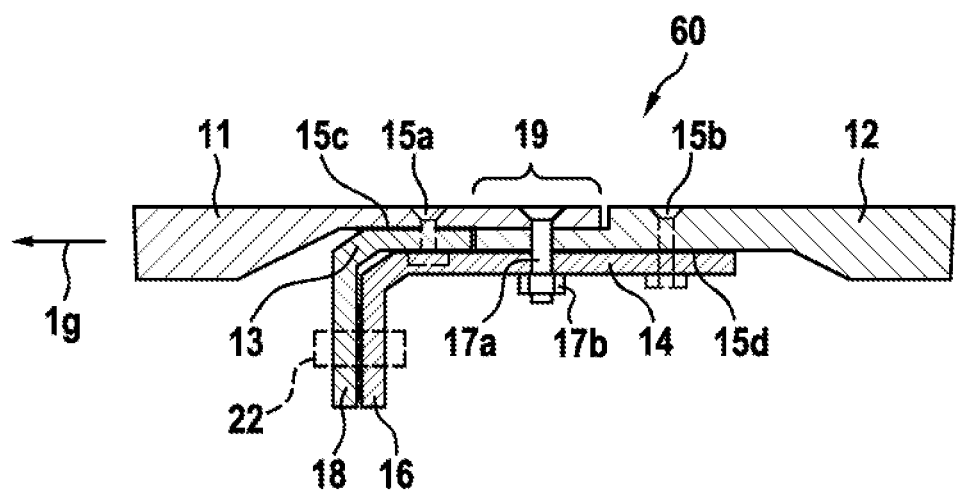
FIG. 6 is a diagram showing a cross-section of an illustrative shear connection with two straight interface parts each with an integrated web, whereby one of the straight interface parts is rigidly and interchangeably connected with two overlapping airframe parts in an overlap section in accordance with some embodiments.

FIG. 6 is a diagram showing a cross-section of an illustrative shear connection 60 with two straight interface parts 13 and 14, each with an integrated web 18 and 16, respectively. Integrated web 16 and/or integrated web 18 may be perpendicular to longitudinal direction 1g.

Bonding or welding materials 15c and 15d or a combination of rivets or screws 15a and 15b and bonding or welding materials 15c and 15d may be used to rigidly and non-interchangeably attach interface parts 13 and 14 to airframe parts 11 and 12, respectively. As shown in FIG. 6, airframe part 11 may overlap with airframe part 12 and interface part 14 in longitudinal direction 1g at overlap section 19. Interface part 13 may be attached to airframe part 11 outside overlap section 19.

A shear bolt including bolt 17a and nut 17b may rigidly and interchangeably connect airframe parts 11 and 12 and interface part 14 at overlap section 19, thereby interchangeably connecting airframe parts 11 and 12. If desired, an optional shear bolt 22 may rigidly and interchangeably attach webs 16 and 18 with each other.

Figure 7:
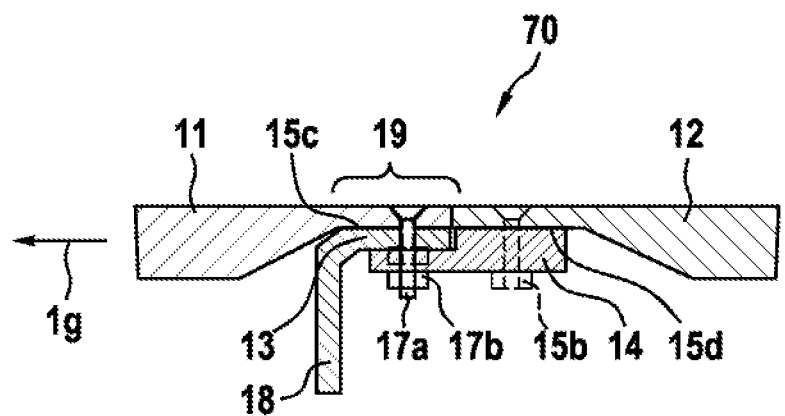
FIG. 7 is a diagram showing a cross-section of an illustrative shear connection with two straight interface parts, one of which has an integrated web, that are rigidly and interchangeably connected with each other and an overlapping airframe part in an overlap section in accordance with some embodiments.

FIG. 7 is a diagram showing a cross-section of an illustrative shear connection 70 with two straight interface parts 13 and 14. Interface part 14 may have a thickness that is different inside overlap section 19 than outside overlap section 19. Interface part 13 may have integrated web 18. Integrated web 18 may be perpendicular to longitudinal direction 1g.

Bonding or welding materials 15c and 15d may be used to rigidly and non-interchangeably attach interface parts 13 and 14 to airframe parts 11 and 12, respectively. If desired, a combination of rivet or screw 15b and bonding or welding materials 15d may be used to rigidly and non-interchangeably attach interface part 14 to airframe part 12. As shown in FIG. 7, airframe part 11 may overlap with interface parts 13 and 14 in longitudinal direction 1g at overlap section 19.

A shear bolt including bolt 17a and nut 17b may rigidly and interchangeably connect airframe part 11 and interface parts 13 and 14 at overlap section 19, thereby interchangeably connecting airframe parts 11 and 12.

Figure 8:
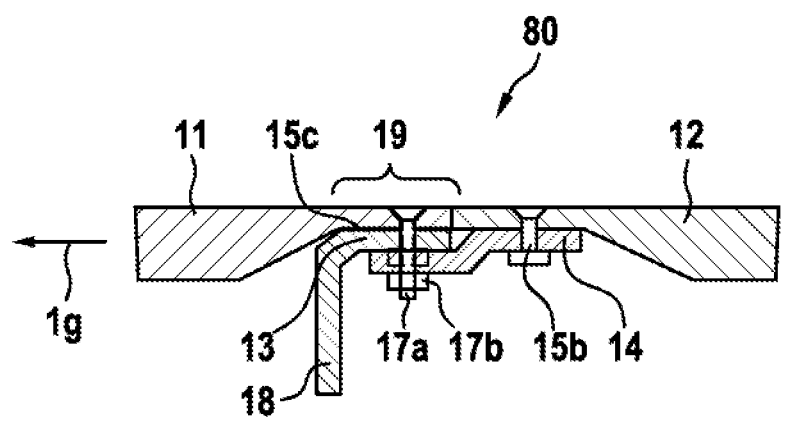
FIG. 8 is a diagram showing a cross-section of an illustrative shear connection with a straight interface part that has an integrated web and an s-shaped interface part, whereby the two interface parts are rigidly and interchangeably connected with each other and an overlapping airframe part in an overlap section in accordance with some embodiments.

FIG. 8 is a diagram showing a cross-section of an illustrative shear connection 80 with a straight interface part 13 that has an integrated web 18 and an s-shaped interface part 14. Integrated web 18 may be perpendicular to longitudinal direction 1g.

As shown, bonding or welding materials 15c may be used to rigidly and non-interchangeably attach interface part 13 to airframe part 11 inside overlap section 19. If desired, rivet or screw 15b and/or bonding or welding materials may be used to rigidly and non-interchangeably attach interface part 14 to airframe part 12. As shown in FIG. 8, airframe part 11 may overlap with interface parts 13 and 14 in longitudinal direction 1g at overlap section 19.

A shear bolt including bolt 17a and nut 17b may rigidly and interchangeably connect airframe part 11 and interface parts 13 and 14 at overlap section 19, thereby interchangeably connecting airframe parts 11 and 12.

Figure 9A:
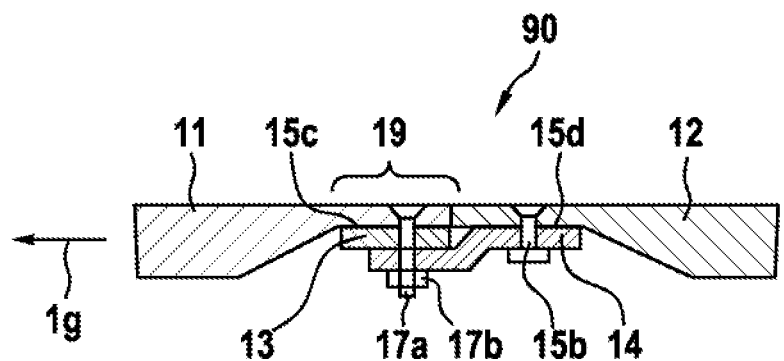
FIG. 9A is a diagram showing a cross-section of an illustrative shear connection with a straight interface part and an s-shaped interface part that are rigidly and interchangeably connected with each other and an overlapping airframe part in an overlap section in accordance with some embodiments.

FIG. 9A shows shear connection 90 that is similar to shear connection 80 of FIG. 8. Shear connection 90 may differ from shear connection 80 in that straight interface part 13 lacks an integrated web.

Figure 9B:
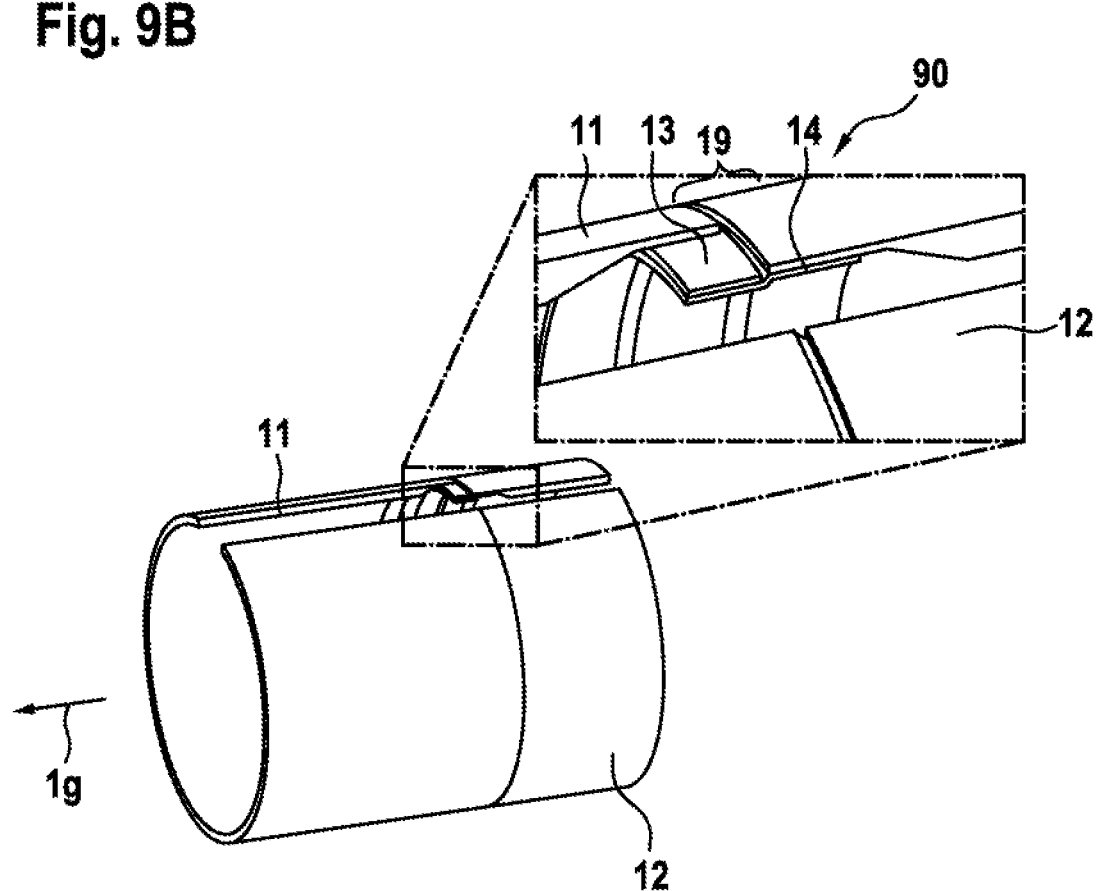
FIG. 9B is a diagram of a three-dimensional representation of the illustrative shear connection of FIG. 9A in accordance with some embodiments.

FIG. 9B is a diagram of a three-dimensional representation of shear connection 90 of FIG. 9A in accordance with some embodiments.

Figure 10:
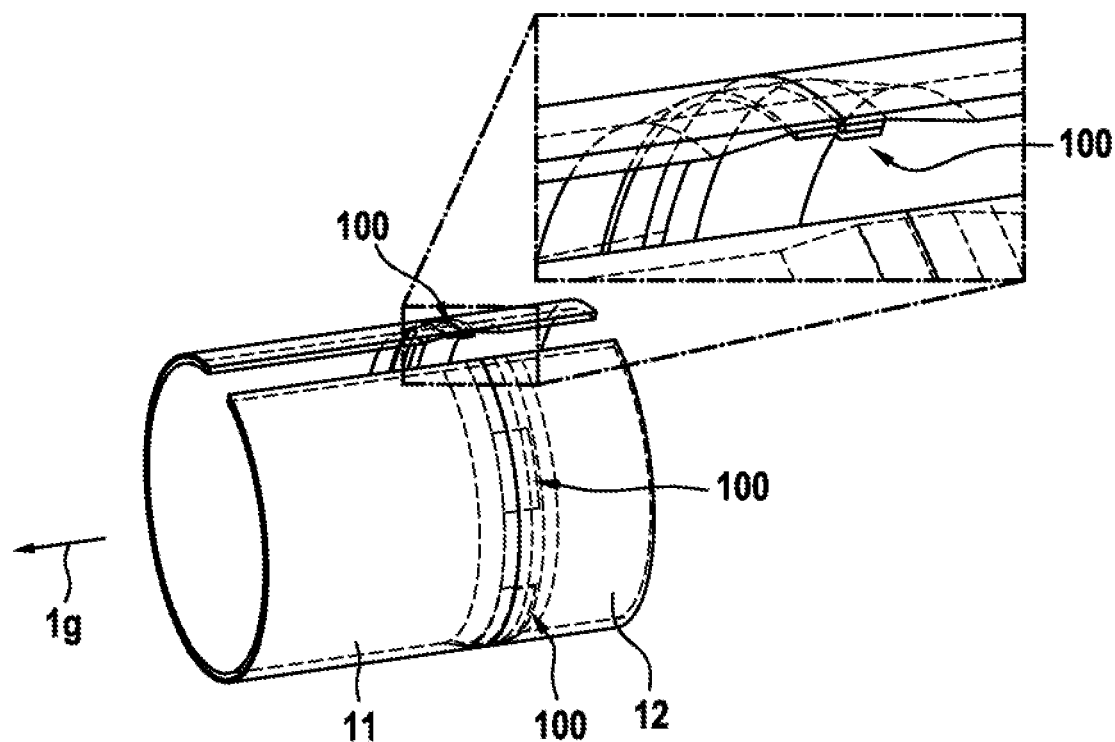
FIG. 10 is a diagram of a three-dimensional representation of illustrative shear connection sections in accordance with some embodiments.

In some embodiments, the shear connection may include discrete load paths where the shear force is absorbed by a predetermined number of shear joints. FIG. 10 is a diagram of a three-dimensional representation of illustrative shear connection 100 that includes sections of the interface plane in which interface parts form discrete load paths between the airframe parts 11 and 12. Each of the sections of the interface plane may implement share joints using any of the shear connections 20, 30, 40, 50, 60, 70, 80, or 90 of FIGS. 2A to 9B. If desired, all sections of the interface plane use the same shear connection. For example, all sections of the interface plane may implement a shear joint of shear connection 90 described in FIGS. 9A and 9B. As another example, all sections of the interface plane may implement a shear joint of shear connection 110 described in FIG. 11.

Figure 11:
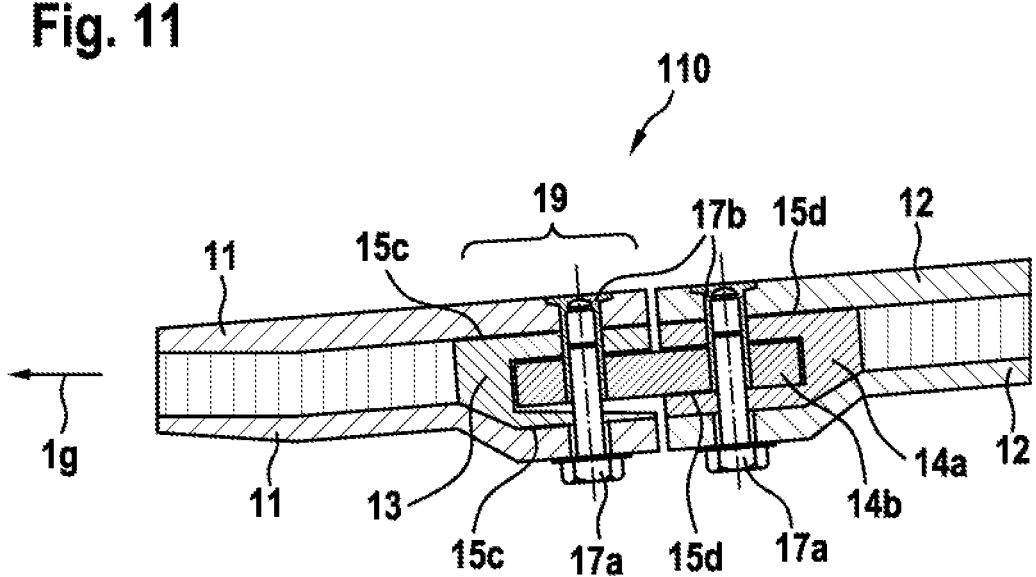
FIG. 11 is a diagram showing a cross-section of an illustrative shear connection with two fork-shaped interface parts of which at least one is rigidly and interchangeably connected with a third straight interface part and an overlapping airframe part in an overlap section in accordance with some embodiments.

FIG. 11 is a diagram showing a cross-section of an illustrative shear connection 110 with two fork-shaped interface parts 13 and 14a that are attached with fork-shaped airframe parts 11 and 12, respectively.

Bonding or welding materials 15c and 15d may be used to rigidly and non-interchangeably attach interface parts 13 and 14a to airframe parts 11 and 12, respectively. If desired, shear connection 110 may have an additional interface part 14b. Interface part 14b may be a sheet, a bar, or a tube. In some embodiments, interface part 14b may have two holes. Bonding or welding materials 15d may rigidly and non-interchangeably attach the additional interface part 14b to interface part 14a. A shear bolt including bolt 17a and nut 17b may attach airframe part 12 with interface parts 14a and 14b. In some embodiments, a rivet or screw may rigidly and non-interchangeably attach airframe part 12 with interface parts 14a and 14b.

As shown in FIG. 11, interface part 14b may overlap with airframe part 11 and interface part 13 in longitudinal direction 1g at overlap section 19.

A shear bolt including bolt 17a and nut 17b may rigidly and interchangeably connect airframe parts 11 and interface parts 13 and 14b at overlap section 19, thereby interchangeably connecting airframe parts 11 and 12.

Figure 12:
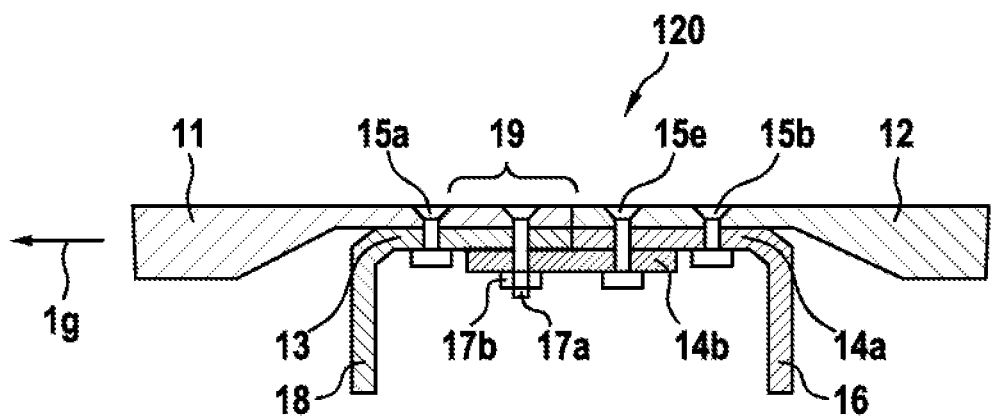
FIG. 12 is a diagram showing a cross-section of an illustrative shear connection with three straight interface parts two of which have an integrated web, whereby the straight interface part without a web is rigidly and interchangeably connected with one of the straight interface parts with integrated web and an overlapping airframe part in an overlap section in accordance with some embodiments.

FIG. 12 is a diagram showing a cross-section of an illustrative shear connection 120 with three straight interface parts 13, 14a, and 14b. Interface parts 13 and 14a may have integrated web 18 and 16, respectively.

Rivets or screws 15a and 15b or a combination of rivets or screws 15a and 15b and bonding or welding materials 15c and 15d may be used to rigidly and non-interchangeably attach interface parts 13 and 14a to airframe parts 11 and 12, respectively. A rivet or a screw 15e or a combination of rivet or screw 15e and bonding or welding materials may be used to rigidly and non-interchangeably attach interface part 14b to interface part 14a and/or airframe part 12.

As shown in FIG. 12, interface part 14b may overlap with airframe part 11 and interface part 13 in longitudinal direction 1g at overlap section 19.

A shear bolt including bolt 17a and nut 17b may rigidly and interchangeably connect airframe parts 11 and interface parts 13 and 14b at overlap section 19, thereby interchangeably connecting airframe parts 11 and 12.

Figure 13:
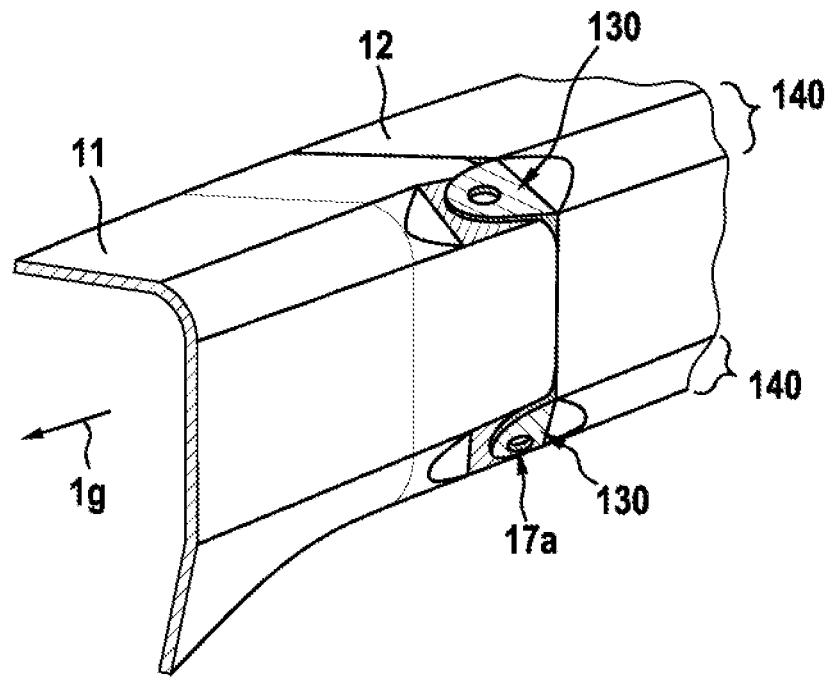
FIG. 13 is a diagram showing a three-dimensional representation of four illustrative shear connections placed at main load carrying stiffened corners in accordance with some embodiments.

FIG. 13 is a diagram of a three-dimensional representation of four illustrative discrete shear connections 130 placed at main load carrying, stiffened corners 140 that form discrete load paths between the airframe parts 11 and 12. Each of the four shear connections 130 may implement any of the shear connections 20, 30, 40, 50, 60, 70, 80, 90, 110, or 120 of FIGS. 2A to 9B, 11, and 12, if desired. For example, all shear connections 130 may implement shear connection 90 described in FIGS. 9A and 9B. As shown in FIG. 13, all shear connections 130 may implement shear connection 130 described in FIG. 14.

Figure 14:
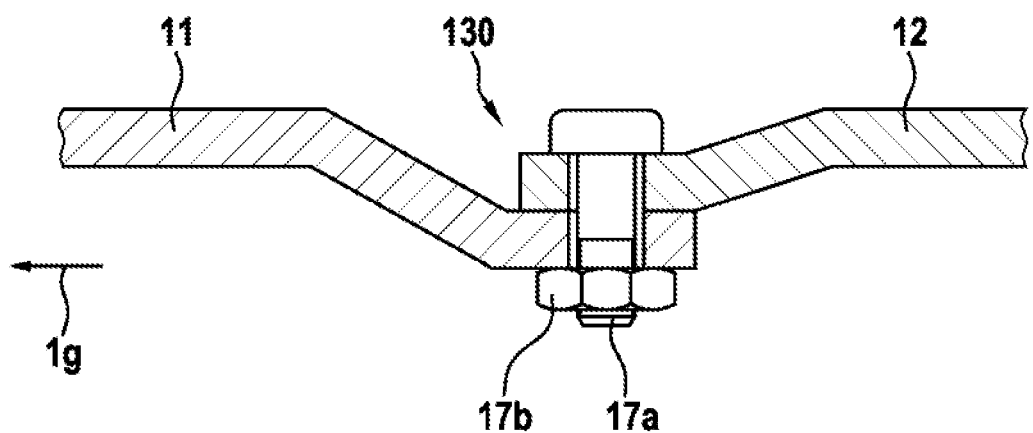
FIG. 14 is a diagram showing a cross-section of an illustrative shear connection with two s-shaped interface parts that are rigidly and interchangeably connected to each other in an overlap section in accordance with some embodiments.

FIG. 14 is a diagram showing a cross-section of an illustrative shear connection 130 with two airframe parts 11, 12. As shown in FIG. 14, shear connection 130 may include airframe parts 11 and 12 and a shear bolt including bolt 17a and nut 17b. As shown in FIG. 14, airframe part 11 may overlap with airframe part 12 in longitudinal direction 1g. At least one of airframe parts 11 and 12 may be s-shaped. The shear bolt including bolt 17a and nut 17b may rigidly and interchangeably connect airframe parts 11 and 12 at an overlap section.

It should be noted that the above described embodiments are merely described to illustrate possible realizations of the present invention, but not in order to restrict the present invention thereto. Instead, multiple modifications and variations of the invention are possible and should, therefore, also be considered as being part of the invention.

By way of example, the interface parts 13, 14 of FIG. 2A may have a different shape than an s-shape. For example, one of the interface parts 13, 14 of FIG. 2A may be replaced with an interface part that is slotted and overlaps the other interface part in the longitudinal direction on both sides. If desired, both interface parts 13 and 14 may be slotted and overlap each other at the overlap section 19 in the longitudinal direction 1g. As another example, interface parts 13 and 14 may have any angle that is different than the 45° angle between the straight portions and the transition portions of the interface parts 13, 14 of FIG. 2A. Moreover, the integrated webs 16 and/or 18 of FIGS. 6 and 12 may form an angle that is different than a 90° angle with the longitudinal direction 1g, and so on.

REFERENCE LIST 1 helicopter
1a multi-blade main rotor
1b, 1c rotor blades
1d rotor head
1e rotor shaft
1f landing gear
1g longitudinal extension direction
2 fuselage
2a cabin
2b rear fuselage
3 tail boom
3a horizontal stabilizer
3b tail boom cone
4 counter-torque device
4a tail rotor
5 fin
6 connection interface between tail boom and rear fuselage
6a interface plane with shear connection
11, 12 airframe parts
13, 14, 14a, 14b interface parts
15a, 15b, 15e rivets or screws
15c, 15d bonding or welding materials
16 web
17a bolt
17b nut
18 web
19 overlap section
20 shear connection
22 shear pin
30, 40, 50, 60, 70, 80, 90, 100, 110, 120, 130 shear connections
140 load carrying, stiffened corner

What is claimed is:
1. A helicopter with a fuselage and a tail boom comprising a tail boom cone that is connected to a rear fuselage defined by the fuselage, the helicopter comprising:
  a first airframe part that is constituted by one of the rear fuselage or the tail boom cone and has a longitudinal extension direction, an inside surface, and an outside surface;
  a second airframe part that is constituted by the other one of the rear fuselage or the tail boom cone and has an inside surface and an outside surface; and
  a shear connection, comprising:
    a first interface part;

a second interface part that overlaps in the longitudinal extension direction at an overlap section with at least one of the first interface part and the first airframe part;

means that rigidly and non-interchangeably attach the first interface part to only the inside surface of the first airframe part and the second interface part to only one of the inside surface and the outside surface of the second airframe part; and a shear bolt that rigidly and interchangeably connects the second interface part with the at least one of the first interface part and the first airframe part at the overlap section, thereby interchangeably connecting the first and second airframe parts.

2. The helicopter of claim 1, wherein the means that rigidly and non-interchangeably attach the first interface part to only the inside surface of the first airframe part and the second interface part to only one of the inside surface and the outside surface of the second airframe part comprise at least one of a bonding material, a welding material, a rivet, or a screw.

3. The helicopter of claim 1, wherein the first and second airframe parts are non-overlapping with the overlap section.

4. The helicopter of claim 1, wherein the first airframe part at least partially overlaps the second interface part at the overlap section.

5. The helicopter of claim 4, wherein the second airframe part at least partially overlaps the first airframe part at the overlap section.

6. The helicopter of claim 5, wherein the shear bolt rigidly and interchangeably connects the second interface part with the first and second airframe parts.

7. The helicopter of claim 4, wherein the shear bolt rigidly and interchangeably connects the first and second interface parts with the first airframe part.

8. The helicopter of claim 4, wherein each of the first and second interface parts comprises a shear joint.

9. The helicopter of claim 5, wherein the shear connection further comprises:
a web integrated into at least one of the first and second interface parts.

10. The helicopter of claim 9, wherein the web is perpendicular to the longitudinal extension direction.

11. The helicopter of claim 1, wherein the first airframe part is slotted and overlaps the second interface part in the longitudinal direction at the overlap section on both sides.

12. The helicopter of claim 11, wherein the second airframe part is slotted and overlaps the second interface part in the longitudinal direction.

13. The helicopter of claim 1, wherein the shear connection further comprises:
a plurality of pilot holes for the means that rigidly and non-interchangeably attach the first interface part to the first airframe part and the second interface part to the second airframe part in the first and second airframe parts to secure a precise fit at the shear connection.

14. The helicopter of claim 1, wherein the first and second airframe parts have a plurality of load carrying, stiffened corners and wherein the shear connection is placed in each of the plurality of load carrying, stiffened corners to form a plurality of discrete load paths between the first and second airframe parts.

15. A helicopter with a fuselage and a tail boom comprising a tail boom cone connected to a rear fuselage defined by the fuselage, the helicopter comprising:

a first airframe part constituting one of the rear fuselage and the tail boom cone, the first airframe part having a longitudinal extension direction, an inside surface, and an outside surface;

a second airframe part constituting the other one of the rear fuselage and the tail boom cone, the second airframe part having an inside surface and an outside surface; and a shear connection comprising:
a first interface part;
a second interface part overlaping in the longitudinal extension direction at an overlap section with the first interface part or the first airframe part;
means rigidly and non-interchangeably attaching the first interface part to only the inside surface of the first airframe part and the second interface part to only one of the inside surface and the outside surface of the second airframe part; and
a shear bolt rigidly and interchangeably connecting the second interface part with the first interface part or the first airframe part at the overlap section, thereby interchangeably connecting the first and second airframe parts.

16. The helicopter of claim 15, wherein the first and second airframe parts are non-overlapping with the overlap section.

17. The helicopter of claim 15, wherein the first airframe part at least partially overlaps the second interface part at the overlap section.

18. The helicopter of claim 17, wherein the second airframe part at least partially overlaps the first airframe part at the overlap section.

19. A helicopter comprising:
a fuselage having a rear fuselage;
a tail boom having a tail boom cone connected to the rear fuselage;
a first airframe component constituting one of the rear fuselage or the tail boom cone and having a longitudinal extension direction, an inside surface, and an outside surface;
a second airframe component constituting the other one of the rear fuselage and the tail boom cone and having an inside surface and an outside surface; and
a shear connection comprising:
a first interface component;
a second interface component overlaping in the longitudinal extension direction at an overlap section with at least one of the first interface component and the first airframe component, the first interface component rigidly and non-interchangeably attached to only the inside surface of the first airframe component, the second interface component rigidly and non-interchangeably attached to only one of the inside surface and the outside surface of the second airframe component; and
a shear bolt rigidly and interchangeably connecting the second interface component with the at least one of the first interface component and the first airframe component at the overlap section, thereby interchangeably connecting the first and second airframe components.

20. The helicopter of claim 19, wherein the first and second airframe parts are non-overlapping with the overlap section.

* * * * *